Figure 1:
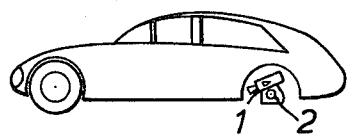

United States Patent [19]
Tyler

[11] 4,176,352
[45] Nov. 27, 1979

[54] APPARATUS FOR DERIVING INFORMATION CONCERNING THE MOVEMENTS OF A VEHICLE

[75] Inventor: Ronald A. Tyler, Chelmsford, England

[73] Assignee: The Marconi Company Limited, Chelmsford, England

[21] Appl. No.: 645,714

[22] Filed: Dec. 31, 1975

[30] Foreign Application Priority Data

Jan. 2, 1975 [GB] United Kingdom ............... 15/75

[51] Int. Cl.² .......................................... G01S 9/50
[52] U.S. Cl. .................................. 343/9 R; 340/32
[58] Field of Search .................. 340/32, 33, 34, 23, 340/24; 180/98, 105 R, 105 E; 343/8, 9, 113 DE, 7 VM, 7 A, 7 ED

[56] References Cited

U.S. PATENT DOCUMENTS

| | | | |
|---|---|---|---|
| 2,855,590 | 10/1958 | Gray | 343/8 |
| 3,728,630 | 4/1973 | Strenglein | 325/8 |
| 3,757,325 | 9/1973 | Sato et al. | 343/7 VM |
| 3,783,445 | 1/1974 | Penwarden | 340/24 |
| 3,787,862 | 1/1974 | Jacobson | 343/113 DE |
| 3,798,648 | 3/1974 | Lammers | 343/113 DE |
| 3,899,251 | 8/1975 | Frenk et al. | 343/9 |

Primary Examiner—John W. Caldwell, Sr.
Assistant Examiner—James J. Groody
Attorney, Agent, or Firm—Diller, Ramik & Wight

[57] ABSTRACT

The invention provides an apparatus for deriving information concerning the movement of a road vehicle. In a preferred example a single microwave source is mounted under the vehicle to illuminate the road surface. Two receiving ports are provided, one to receive energy reflected from the illuminated surface to one side of the center line of the vehicle and the other to receive energy reflected from the illuminated surface to the other side of the center line. The two Doppler shifts are determined and compared to determine if there is a difference which indicates that the vehicle is turning, the sign of any difference indicating the direction of turn. One of the Doppler signals is shaped and counted to provide an indication of the speed of the vehicle and one of the Doppler signals is processed to provide an indication of forward or reverse motion.

1 Claim, 4 Drawing Figures

APPARATUS FOR DERIVING INFORMATION CONCERNING THE MOVEMENTS OF A VEHICLE

This invention relates to apparatus for deriving information concerning the movement of a vehicle over a surface. In particular, the invention is concerned with apparatus for deriving such information for use in vehicle location systems such as are the concern of our co-pending application Ser. Nos. 606,955 and 584,596, now respectively U.S. Pat. Nos. 3,947,807 of Mar. 30, 1976 and 3,984,806 of Oct. 5, 1976.

In both of the inventions in our co-pending applications mentioned above, information is required to be derived concerning the distance travelled by a vehicle and the extent and direction of any turn which the vehicle may make. In a practical system applied to a wheeled road vehicle the required distance log and turn indicator have been electro-mechanical in nature relying on the one hand on being driven in synchronism with the road wheels of the vehicle and on the other hand upon being turned as the steering gear of the vehicle is turned. The use of such electro-mechanical devices does, however, involve a number of practical disadvantages. Because of their moving parts, maintenance is required and mechanical wear must, of course, be expected. In addition, such factors as tire wear, tire pressures and the extent of slip between the wheel and the road surface contribute to inaccuracies in the information signals which are produced. As is well known, the extent to which a vehicle turns off-course does not bear a constant relationship with the extent to which the steering gear is turned, but, varies with such factors as speed and the condition of the road surface.

A principal object of this invention is to provide an improved apparatus in which the extent to which reliance need be placed upon electro-mechanical devices for deriving the basic turn and/or distance-travelled information is reduced.

According to this invention, an apparatus for deriving information concerning the movements of a surface-borne vehicle comprises means for illuminating the surface over which the vehicle is to travel with electro-magnetic energy, means for receiving reflected electro-magnetic energy from a portion of said illuminated surface to one side of a line extending along the length of said vehicle, means for receiving electro-magnetic energy from another portion of said illuminated surface to the other side of said line, means for deriving the Doppler frequency components in the energy received by each receiving means and means for utilising said two Doppler frequency components to provide information concerning the movement of said vehicle over said surface.

The term "surface-borne vehicle" is used to denote a vehicle which travels in contact with or in close proximity to the earth's surface, i.e. water craft, land craft and hovercraft, as distinct from aircraft or space craft.

Whilst the information provided may be utilised in a variety of ways, preferably said apparatus forms part of a system for indicating the position of the vehicle, whilst travelling over a predetermined network of routes. In particular, the system is preferably in accordance with one or other of said U.S. Pat. Nos. 3,947,807 and 3,984,806.

The electro-magnetic energy may be ultra-sonic, but, preferably this is of radio frequency and preferably of microwave frequency.

Said means for illuminating the surface over which the vehicle is to travel with electro-magnetic energy may comprise a separate source of energy for reflection from each of said points on said surface, but, preferably a single source of electro-magnetic energy is utilized in order to ensure coherence.

Preferably said single source of energy comprises a gun diode microwave oscillator connected to feed a transmission port directed at said surface.

Preferably means are provided for determining the difference between said two Doppler frequency components in order to provide an indication of the extent of any turn and means are provided for detecting the sign of said difference in order to indicate the direction of any turn in relation to the heading of the vehicle.

Means may also be provided for detecting when said difference is zero, or substantially so, in order to provide an indication that the vehicle is travelling in a straight-ahead position.

Normally, each Doppler frequency component is converted to a voltage in a frequency-to-voltage converter prior to said difference being determined and a voltage difference detector is provided to compare the two Doppler frequency representative voltages and provide a voltage output which is representative of said difference.

Means may be provided for shaping one of said Doppler frequency components and counting the individual waves thereof to provide an indication of the mean distance travelled by the vehicle. When the arrangement forms part of a system as disclosed in either of our co-pending applications mentioned above, normally this counter would be arranged to be reset to zero at each junction in the system.

Preferably means are provided for feeding, via a 90° phase shifter, a portion of the electro-magnetic energy received by one of said receiving means to a further means for deriving the Doppler frequency component therein and phase comparator means having one input derived from said further Doppler frequency component deriving means and a second input derived from that one of said first-mentioned two Doppler frequency component deriving means which is associated with that one of the receiving means, whereby said last-mentioned phase comparator provides one output signal if said vehicle is travelling in a forward direction and a different output signal if said vehicle is travelling in a reverse direction, in dependence upon the phase relationship of the signals at its input.

When fitted to a land vehicle, preferably at least the transmitting and receiving ports are mounted on an unsprung part of the vehicle. In the case of a conventional motor car, the whole apparatus may be mounted on the back axle thereof, in which case a transmitting port for electro-magnetic energy to illuminate the road surface is so directed that the center of the radiation pattern illuminating said road surface lies approximately 2 ft. in advance of said rear axle.

Figure 2:
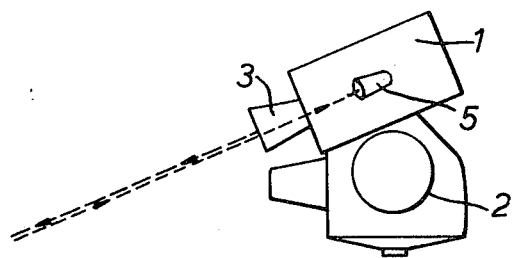
Figure 3:
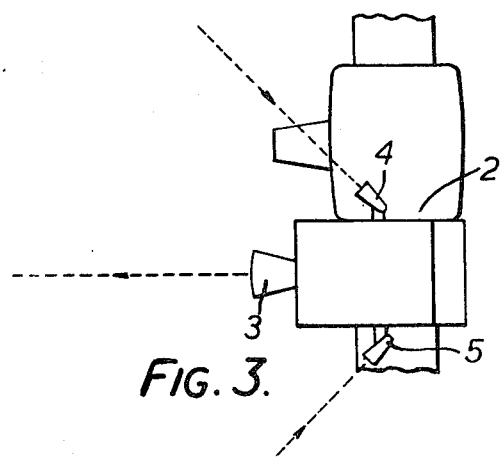
Figure 4:
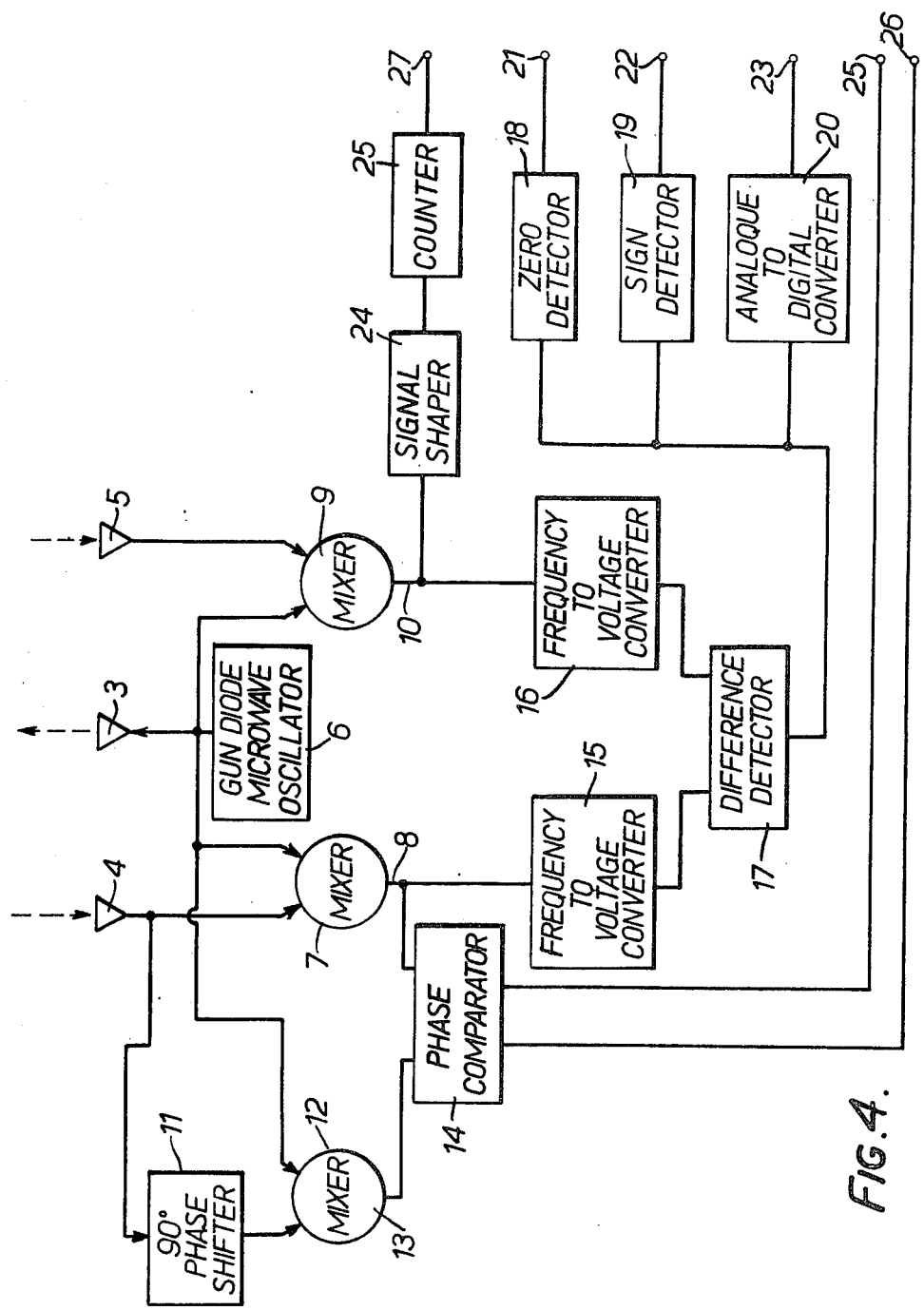

The invention is illustrated in and further described with reference to the accompanying drawing in which, FIG. 1 schematically represents the position of an equipment in accordance with the present invention when fitted to a typical motor car, FIGS. 2 and 3 show in greater detail the equipment mounted on the rear axle of the vehicle in order to indicate the directivities of the electro-magnetic energy output and input ports and FIG. 4 is a block schematic diagram showing the circuit components of one example of the equipment.

Referring to FIGS. 1 to 3, the equipment has a housing 1 which is mounted on the rear axle 2 of the vehicle. A first transmission port 3 is provided to transmit electro-magnetic energy in a flood beam towards the road surface such that the center of the energy pattern contacts the road surface at a point approximately 2 ft. in front of the rear axle 2. The electro-magnetic energy inlet ports 4 and 5 are provided to receive electro-magnetic energy returned from the road surface. This returned electro-magnetic energy will contain a Doppler component which is dependent upon the relative velocity of that portion of the road surface to which the particular input port 4 or 5 is directed. As represented, inlet port 4 is directed to receive energy from a portion of the road surface in front of the axle 2 and to the right hand side (looking forward) of the centre of the energy pattern originating from outlet port 3. Inlet port 5 is directed to receive energy from a portion of the road surface in front of the axle 2 and to the left hand side (looking forward) of the centre of the energy pattern originating from port 3. In other words ports 4 and 5 receive energy reflected from portions of illuminated surface on either side of a line extending along the length of the vehicle. The inclination of the main directivities of the ports 4 and 5 with respect to said line is not critical, but will commonly be of the order of 45°, in the horizontal plane. The depression of the ports 4 and 5 is such that again the portions of surface looked at by each is approximately 2 ft. in front of the axle.

As has already been mentioned the electro-magnetic energy received by the ports 4 and 5 will contain a Doppler frequency component which is dependent upon the velocity of that portion of the road towards which the particular port is directed. When the vehicle is travelling in a straight line, the Doppler components received by each port 4 and 5 will be sensibly equal. If, however, the vehicle engages in a right handturn, the Doppler frequency component in the energy received by port 5 will be greater than that present in the energy received by port 4 to an extent dependent upon the rate of turn. The reason for this is that the relative velocity of the portion of road surface to which port 5 is directed is greater than that of the portion of road to which port 4 is directed when the vehicle is engaged on a right hand turn.

From the Doppler information thus derived, data signals may be developed which represent firstly the mean velocity of the vehicle, secondly the rate and direction of turn of the vehicle and thirdly the general direction of the vehicle, i.e. forwards and backwards. One circuit arrangement for deriving these data signals will now be described with reference to FIG. 4.

Referring to FIG. 4, the ports 3, 4 and 5 of FIG. 3 are represented by the correspondingly numbered blocks in FIG. 4. The flood beam provided by port 3 is derived from a gun diode microwave oscillator 6. Energy returning from the road surface and received by port 4 is mixed in a mixer 7 with a portion of the output of the oscillator 6 to provide, at the output 8 of the mixer 7, a Doppler frequency which is related to the relative speed of the portion of road to which port 4 is directed. Similarly, energy received by port 5 is mixed in a mixer 9 with a portion of the output of oscillator 6, so that, at the output 10 of mixer 9, a Doppler frequency is provided which is related to the relative velocity of the portion of road surface to which the port 5 is directed.

Energy received by port 4 is also connected through a 90° phase shifter 11 to a further mixer 12 to be mixed with a portion of the output of oscillator 6. The Doppler signal at the output 13 of mixer 12 will be similar in frequency to that at the output 8 of mixer 7, but the phase of the signal at 13 will either lead or lag the phase of the signal at 8 in dependence upon whether the vehicle is travelling in a forward or a reverse direction. The phases of the signals at 8 and 13 are arranged to be compared in a phase comparator 14 which provides an output to terminal 25 if the relative phase indicates reverse motion and an output to terminal 26 if the relative phases indicate forward motion.

The outputs 8 and 10 of mixers 7 and 9 are connected to respective frequency to voltage converters 15 and 16 which in turn are connected to a voltage difference detector 17, the output of which will vary in magnitude in dependence upon the degree of turn and the sign of which will depend upon whether the turn is to the left or to the right. The output of voltage difference detector 17 is connected to a zero detector 18, a sign detector 19 and an analogue to digital converter 20, which in turn are connected respectively to output terminals 21, 22 and 23. Zero detector 18 will provide an output signal to terminal 21 when difference detector 17 detects that the voltage outputs of converters 15 and 16 are equal, or substantially so, so that an output signal at terminal 21 indicates that the vehicle is travelling straight ahead. Sign detector 19 detects the sign of the output of difference detector 17 and applies a digital signal to terminal 22 which indicates the direction of turn. Analogue to digital converter 20 applies a digital signal to terminal 23, which indicates the magnitude of the output of difference detector 17 and thus the degree of turn.

Doppler frequency at the output 10 of mixer 9 is also applied to a signal shaper 24 which shapes the waveform such that the individual waves may be counted by a counter 25, which counter is connected to apply a digital signal representing its count (and hence mean distance travelled) to a terminal 27.

It will be appreciated, therefore, that at terminals 25, 26, 21, 22, 23 and 27 will appear signals which indicate whether the vehicle is travelling forward or backwards, whether the vehicle is turning or not, and if turning the direction of turn and the extent of the turn, and mean distance travelled. This information may be processed in a manner similar to that disclosed in said U.S. Pat. No. 3,984,806 in order to provide for transmission to a base station and/or for display in the vehicle data concerning the position of the vehicle to which the equipment is fitted along a given network of routes.

The fact that the equipment is mounted on the rear axle of the vehicle means that the distance between the ports 3, 4 and 5 and the ground generally remains constant. Even if no axle is present, whenever possible at least the ports 3, 4 and 5 should be mounted on an unsprung part of the vehicle.

I claim:

1. An apparatus for deriving information concerning the movements of a surface-borne vehicle comprising means for illuminating the surface over which the vehicle is to travel with electro-magnetic energy, means for receiving reflected electro-magnetic energy from a portion of said illuminated surface to one side of a line extending along the length of said vehicle, means for receiving electromagnetic energy from another portion of said illuminated surface to the other side of said line, means for deriving the Doppler frequency components in the energy received by each receiving means, means for utilizing said two Doppler frequency components to provide information concerning the movement of said vehicle over said surface, means provided for feeding, via a 90° phase shifter, a portion of the electro-magnetic energy received by one of said receiving means to a further means for deriving the Doppler frequency component therein and phase comparator means having one input derived from said further Doppler frequency component deriving means and a second input derived from that one of said first-mentioned two Doppler frequency component deriving means which is associated with that one of the receiving means, whereby said last-mentioned phase comparator provides one output signal if said vehicle is travelling in a forward directon and a different output signal if said vehicle is travelling in a reverse direction, in dependence upon the phase relationship of the signals at its input.

* * * * *